United States Patent
Heubel et al.

(10) Patent No.: US 8,902,050 B2
(45) Date of Patent: Dec. 2, 2014

(54) SYSTEMS AND METHODS FOR HAPTIC AUGMENTATION OF VOICE-TO-TEXT CONVERSION

(75) Inventors: Robert W. Heubel, San Leandro, CA (US); Erin Ramsay, Montreal (CA)

(73) Assignee: Immersion Corporation, San Jose, CA (US)

( * ) Notice: Subject to any disclaimer, the term of this patent is extended or adjusted under 35 U.S.C. 154(b) by 1108 days.

(21) Appl. No.: 12/608,707

(22) Filed: Oct. 29, 2009

(65) Prior Publication Data

US 2011/0102160 A1 May 5, 2011

(51) Int. Cl.
- *H04B 3/36* (2006.01)
- *G10L 15/26* (2006.01)
- *G06F 3/01* (2006.01)
- *G06F 3/16* (2006.01)

(52) U.S. Cl.
CPC .......... *G06F 3/016* (2013.01); *G06F 2203/011* (2013.01); *G10L 15/265* (2013.01); *G06F 3/16* (2013.01); *G06F 3/011* (2013.01)
USPC ............... 340/407.1; 340/539.1; 340/539.11; 340/539.13

(58) Field of Classification Search
USPC ................ 340/407.1, 539.1, 539.11, 539.13; 607/45
See application file for complete search history.

(56) References Cited

U.S. PATENT DOCUMENTS

| | | | |
|---|---|---|---|
| 8,290,596 B2 * | 10/2012 | Wei et al. ........................ 607/45 |
| 2004/0034535 A1 | 2/2004 | Belenger et al. |
| 2004/0093214 A1 | 5/2004 | Belenger et al. |
| 2005/0131705 A1 | 6/2005 | Gandhi et al. |
| 2007/0033259 A1 | 2/2007 | Weis et al. |
| 2008/0287147 A1 | 11/2008 | Grant et al. |
| 2008/0319279 A1 | 12/2008 | Ramsay et al. |
| 2009/0238386 A1 * | 9/2009 | Usher et al. .................... 381/315 |
| 2011/0093100 A1 | 4/2011 | Ramsey |

FOREIGN PATENT DOCUMENTS

| EP | 1524586 | 4/2005 |
|---|---|---|
| JP | 2006-047640 | 2/2006 |
| WO | WO 02/03172 | 1/2002 |

OTHER PUBLICATIONS

Patent Cooperation Treaty, International Search Report and Written Opinion, International Application No. PCT/US2010/054212, mailed Jan. 17, 2011.
Patent Cooperation Treaty, Notification Concerning Transmittal of International Preliminary Report on Patentability, Application No. PCT/US2010/054212, mailed May 10, 2012.
Japanese Patent Office, Notice of Reasons for Rejection, Japanese Application No. JP 2012-536981, mailed Apr. 8, 2014.
The State Intellectual Property Office of the People's Republic of China, Notification of First Office Action, Application No. 201080048828, dated Jul. 2, 2014.

* cited by examiner

*Primary Examiner* — Daryl Pope
(74) *Attorney, Agent, or Firm* — Kilpatrick Townsend & Stockton LLP

(57) ABSTRACT

Systems and methods for providing voice-to-text haptic augmentation in a user interface are disclosed. For example, one disclosed system for converting audible speech information to a haptic effect includes a microphone and a processor in communication with the microphone, the processor configured to receive an audio signal associated with a voice from the microphone, determine a characteristic of the audio signal, and generate an actuator signal based at least in part on the characteristic, the actuator signal configured to cause an actuator to output a haptic effect.

22 Claims, 6 Drawing Sheets

SYSTEMS AND METHODS FOR HAPTIC AUGMENTATION OF VOICE-TO-TEXT CONVERSION

FIELD OF THE INVENTION

The present invention generally relates to systems and methods for user interfaces and more particularly to systems and methods for haptic augmentation of voice-to-text conversion.

BACKGROUND OF THE INVENTION

Electronic devices provide users with a variety of feedback, including visual and aural feedback. Some devices also provide forms of haptic feedback to the user. Haptic feedback can in some instances provide a user receiving a message with information that may not be apparent in the message itself. For example, a voice message that is converted into a text message may fail to convey the level of emotion the sending user feels about the topic expressed in the message or to convey other contextual information regarding the message. Users often try to fill this void by expressing this subtext by appending well-known symbols (e.g., emoticons) onto the message. However, such symbols are limited in the complexity of the messages they can convey. In contrast, haptic feedback can provide a more complex and direct way to express such subtext to other users in a more compelling fashion.

SUMMARY OF THE INVENTION

The present invention comprises systems and methods for haptic augmentation of voice-to-text conversion. For example, one embodiment of the present invention comprises a computer-implemented method comprising the steps of receiving an audio signal associated with a voice from a microphone, determining a characteristic of the audio signal, and generating an actuator signal based at least in part on the characteristic. The actuator signal is configured to cause an actuator to output a haptic effect. Another embodiment comprises a computer-readable medium encoded with processor-executable program code for carrying out such a method.

These illustrative embodiments are mentioned not to limit or define the invention, but to provide examples to aid understanding thereof. Illustrative embodiments are discussed in the Detailed Description and further description of the invention is provided therein. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying figures, wherein.

DETAILED DESCRIPTION

Embodiments of the present invention provide systems and methods for haptic augmentation of voice-to-text conversion.

An Illustrative System for Haptic Augmentation of Voice-to-Text Conversion

In one illustrative embodiment of the present invention, a mobile phone comprises a processor and a microphone and speaker in communication with the processor. The mobile phone also comprises an actuator in communication with the processor. The actuator is capable of outputting haptic effects that can be felt by a user of the mobile phone. The user is able to use the phone to record voice messages, which the processor then converts to text messages. In addition, the processor is configured to analyze the voice message in order to determine characteristics of the message.

For example, in one such embodiment, the frequency, amplitude, and duration of the user's voice message is analyzed, and the processor determines a haptic effect corresponding to each these parameters. Then the processor associates the haptic effect or effects with the text version of the message and transmits the message to the intended recipient. In a second embodiment, the user's biorhythms are analyzed, and the processor determines a haptic effect corresponding to the user's biorhythm response. Then, as above, the processor associates the haptic effect or effects with the text version of the message and transmits the message to the intended recipient. It is further envisioned that voice analysis and biorhythm may be done concurrently by the processor to arrive at a determination of a haptic effect to be transmitted to the intended recipient.

In the illustrative embodiment, the recipient also has a mobile device that includes an actuator for outputting haptic effects, such as an eccentric rotating mass ("ERM") motor. When the recipient opens the message, the haptic effect or effects associated with the message are output to the recipient via the mobile device.

For example, the first user may create the message by yelling. When the processor analyzes the voice message, the processor associates the resulting text message with a high amplitude haptic effect such that a receiving user can "feel" the emotion embedded in the message. In another example, when the user creates a voice message while speaking in a high-pitched voice, the processor associates a high frequency haptic effect with the resulting text message.

These illustrative examples are given to introduce the reader to the general subject matter discussed herein. The invention is not limited to these examples. The following sections describe various additional embodiments and examples of systems and methods for haptic augmentation of voice-to-text conversion.

Illustrative Systems for Speech-to-Text Augmentation

Figure 1:
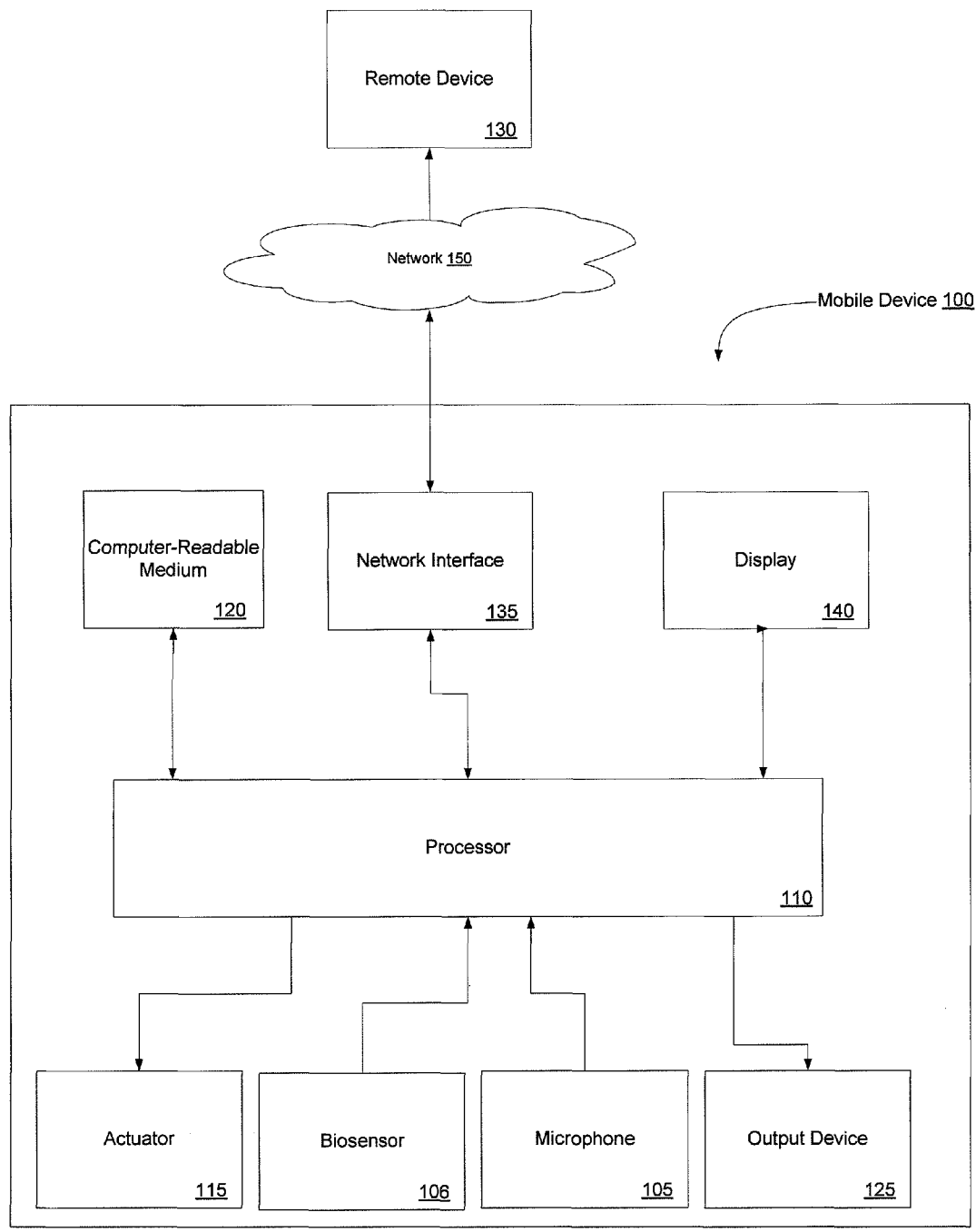
FIG. 1 is a block diagram of a system for haptic augmentation of voice-to-text conversion according to one embodiment of the present invention.

Referring now to the drawings in which like numerals indicate like elements throughout the several Figures, FIG. 1 shows a block diagram of a system for haptic augmentation of voice-to-text conversion according to one embodiment of the present invention. As shown in FIG. 1, the system comprises a mobile device 100. In one embodiment, the mobile device 100 comprises a mobile telephone. In other embodiments, the mobile device 100 may comprises another portable or hand-held electronic device, such as a portable digital assistant (PDA), a portable media player, a portable gaming device, or a laptop computer. In some embodiments, the mobile device 100 may instead comprise a non-portable electronic device, such as a desktop computer.

In the embodiment shown in FIG. 1, the mobile device 100 comprises a microphone 105. The microphone 105 receives audio, such as the voice of a user or an environmental sound, and converts the audio to a corresponding input signal, which is based at least in part on the audio signal from the microphone. In the embodiment shown in FIG. 1, the mobile device 100 also comprises a biosensor 106. The biosensor 106 receives biological information, such as the biorhythm of a user, and converts the biological information to a corresponding input signal based at least in part on the biosensor data.

The mobile device 100 also comprises a processor 110 in communication with the microphone 105. In the embodiment shown, the processor 110 is configured to receive an audio signal from the microphone 105 and process the audio signal. For example, the processor 110 may analyze the audio signal to determine one or more characteristics of the audio signal. In other embodiments, mobile device 100 may comprise a plurality of processors working in concert. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

The mobile device 100 also comprises an actuator 115 in communication with the processor 115. The actuator 115 may comprise one or more of various types of actuators. For example, the actuator 115 may be a piezoelectric actuator, an electronic motor, an electro-magnetic actuator, a voice coil, a shape memory alloy, an electro-active polymer, a solenoid, an eccentric rotating mass motor (ERM), or a linear resonant actuator (LRA). In one embodiment, the mobile device 100 may comprise a plurality of actuators. In such an embodiment, the processor 110 is configured to send a haptic signal to at least one of the plurality of actuators.

Referring still to FIG. 1, the mobile device 100 also comprises computer-readable medium 120. Computer-readable medium 120 may be used to store program code, which when executed by the processor 110, causes the processor to carry out the various steps of the methods disclosed herein. Embodiments of the present invention can be implemented in digital electronic circuitry, or in computer hardware, firmware, software, or in combinations of them. The computer-readable medium 120, such as a random access memory (RAM), is in communication with or coupled to the processor 110. The processor 110 executes computer-executable program instructions stored on the computer-readable medium 120, such as executing one or more computer programs for analyzing an audio signal.

Embodiments of computer-readable media may comprise, but are not limited to, an electronic, optical, magnetic, or other storage device capable of providing a processor, such as the processor 110 in the mobile device 100, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described herein may be in one or more structures, and may be dispersed through one or more structures.

In the embodiment shown in FIG. 1, the mobile device 100 also comprises a speaker 125 in communication with the processor 110. The speaker 125 is configured to output an audio signal, such as a voice message. In one embodiment, the speaker 125 may also be combined with the actuator 115 to output both an audio signal and a haptic effect.

The mobile device 100 shown also comprises a display 140. For example, in an embodiment in which the mobile device 100 is a PDA, the display 140 may comprise a touch-screen interface for displaying messages to a user.

The mobile device 100 also comprises a network interface 135 in communication with the processor 110. The network interface 135 allows the mobile device 100 to communicate with remote device 130 over a network 150. For example, in one embodiment, mobile device 100 may communicate over the Internet with another mobile device or with a computer or other telecommunication device.

In the embodiment shown in FIG. 1, the network interface 135 comprises a baseband processor and a cellular radio configured to allow the mobile device 100 to communicate over one or more cellular telephone networks. In some embodiments, the network interface 135 may comprise other communication devices. For example, in one embodiment, the network interface 135 may comprise an 802.11 wireless Ethernet interface or a Bluetooth interface. In some embodiments, the network interface 220 may comprise a wired network interface, such as an Ethernet adapter. The mobile device 100 may be configured to transmit messages or signals to other devices.

Figure 2:
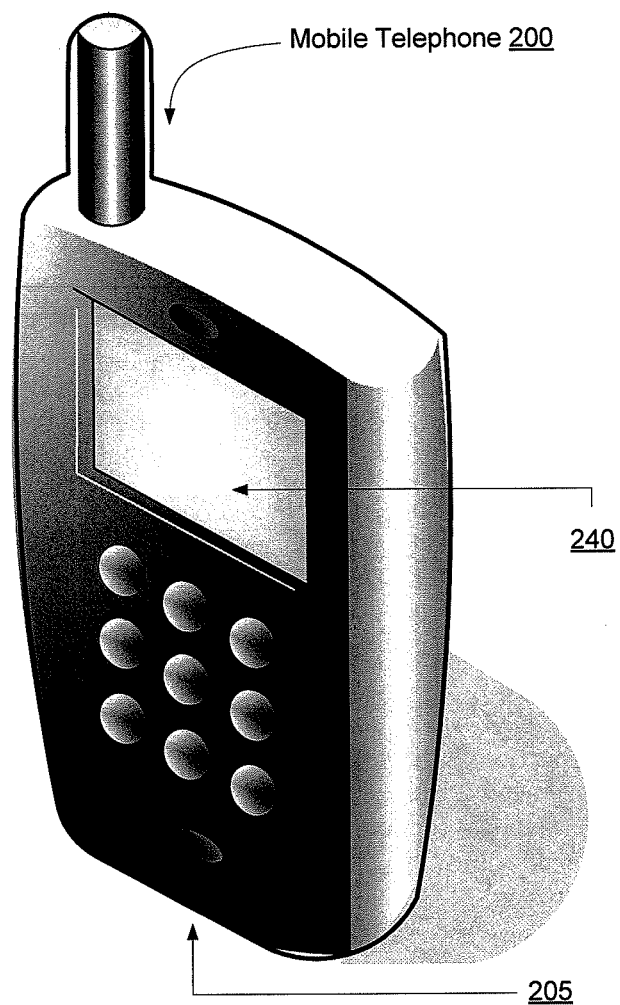
FIG. 2 is an illustration of a system for haptic augmentation of voice-to-text conversion according to one embodiment of the present invention.

Referring now to FIG. 2, FIG. 2 is an illustration of a system for haptic augmentation of voice-to-text conversion according to one embodiment of the present invention. In the embodiment shown in FIG. 2, a mobile telephone 200 comprises a microphone 205 and a display 240. The mobile phone also comprises a processor, actuator, computer-readable medium, and a network interface are of which are disposed in the mobile telephone 200 but none of which is shown in FIG. 2.

Figure 3:
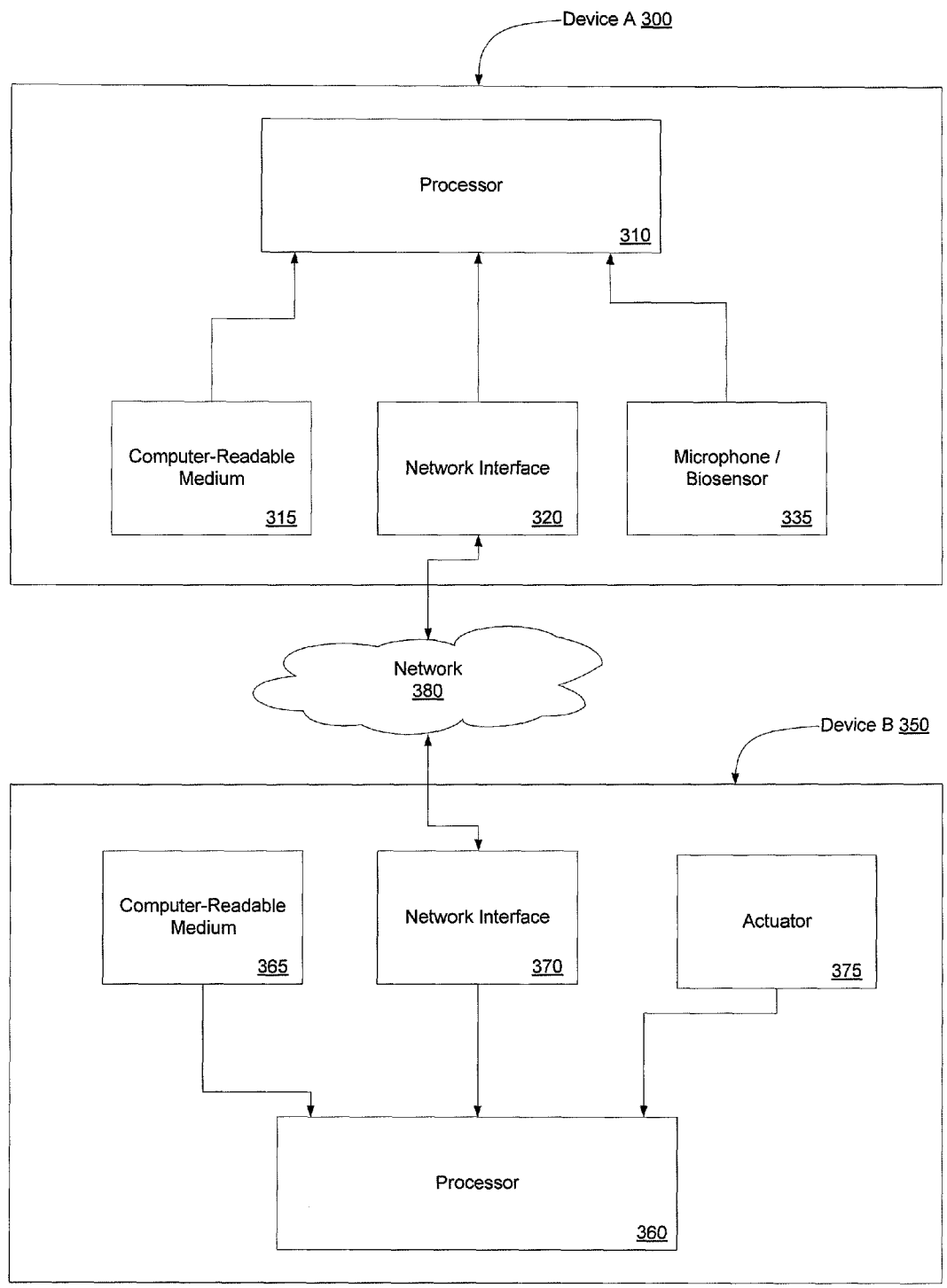
FIG. 3 is a block diagram of a system for haptic augmentation of voice-to-text conversion according to one embodiment of the present invention.

Referring now to FIG. 3, FIG. 3 is a block diagram of a system for haptic augmentation of voice-to-text conversion according to one embodiment of the present invention. In the embodiment shown in FIG. 3, the system comprises two devices, device A 300 and device B 350 in communication over a network 380. In some embodiments, the first device, device A 300, or the second device, device B 350, comprises a portable or handle electronic device, such as a portable digital assistant (PDA), a portable media player, a portable gaming device, a laptop computer, or a mobile telephone. In other embodiments, the first device 300 or the second device 350 comprises a non-portable electronic device, such as a desktop computer.

In the embodiment shown in FIG. 3, the first device 300 comprises a processor 310, a computer-readable medium 315, a network interface 320, and a input device, such as a microphone/biosensor 335. In some embodiments, the first device, device A 300, may also comprise a greater or fewer number of components. For example, the device A 300 may contain one or more of the following: Bluetooth components, a touch-sensitive surface, a mouse, and/or a keyboard. The components of device A 300 function in a similar manner to the corresponding components of those shown in and described in relation to the mobile device 100 of FIG. 1.

In the embodiment shown in FIG. 3, the second device, device B 350, comprises a processor 360, a computer-readable medium 365, a network interface 370, and an actuator 375. In some embodiments, the first device 300 and the second device 350 are similar or identical devices, while in other embodiments, they are not.

In the embodiment shown in FIG. 3, the first and second device processors 310 and 360 are in communication with their respective network interfaces 320 and 370. In the embodiment shown, the network interfaces 320 and 370 each comprise a baseband processor and a cellular radio configured to allow the devices 300 and 350 to communicate with each other or other device using a network 380. For example, such embodiments may communicate over a network 380 comprising one or more cellular telephone networks. In other embodiments, the network interface 320 may comprise other types of network interfaces, such as 802.11 wireless Ethernet, wired Ethernet, Bluetooth, or USB. For example, in one embodiment, the network interface 320 may comprise an 802.11 wireless Ethernet interface.

Illustrative Methods for Speech-to-Text Augmentation

Figure 4:
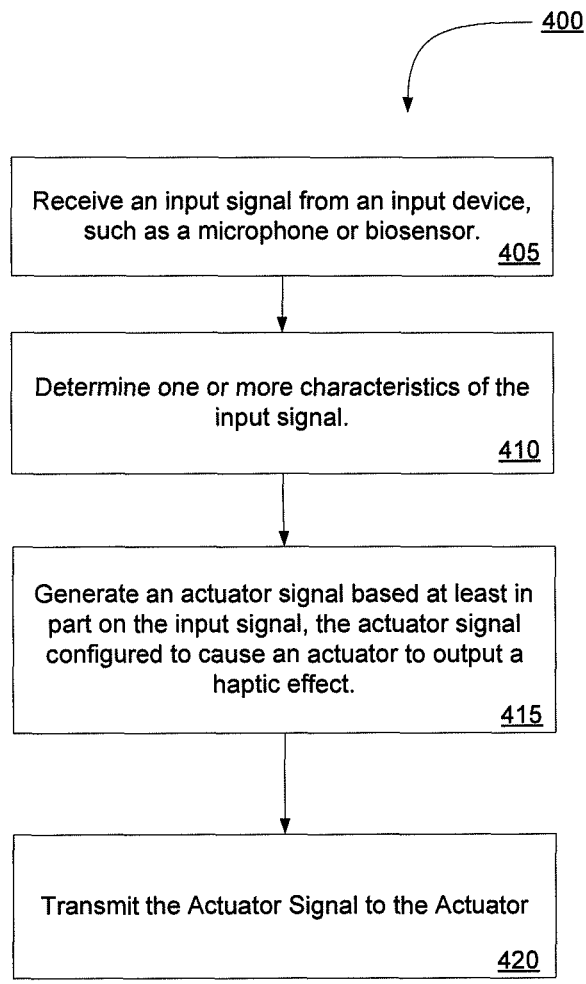
FIG. 4 is a flow diagram of a computer-implemented method for haptic augmentation of voice-to-text conversion according to one embodiment of the present invention.
Figure 5:
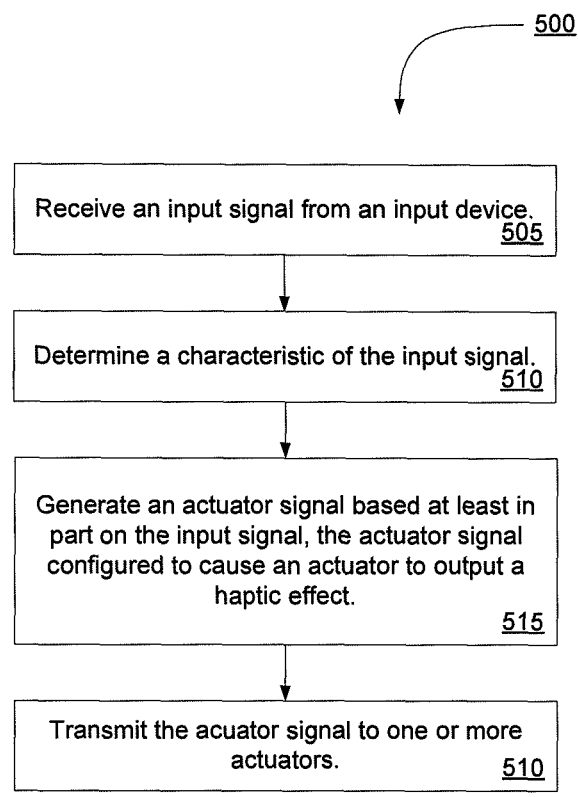
FIG. 5 is a flow diagram of a computer-implemented method for haptic augmentation of voice-to-text conversion according to one embodiment of the present invention.
Figure 6:
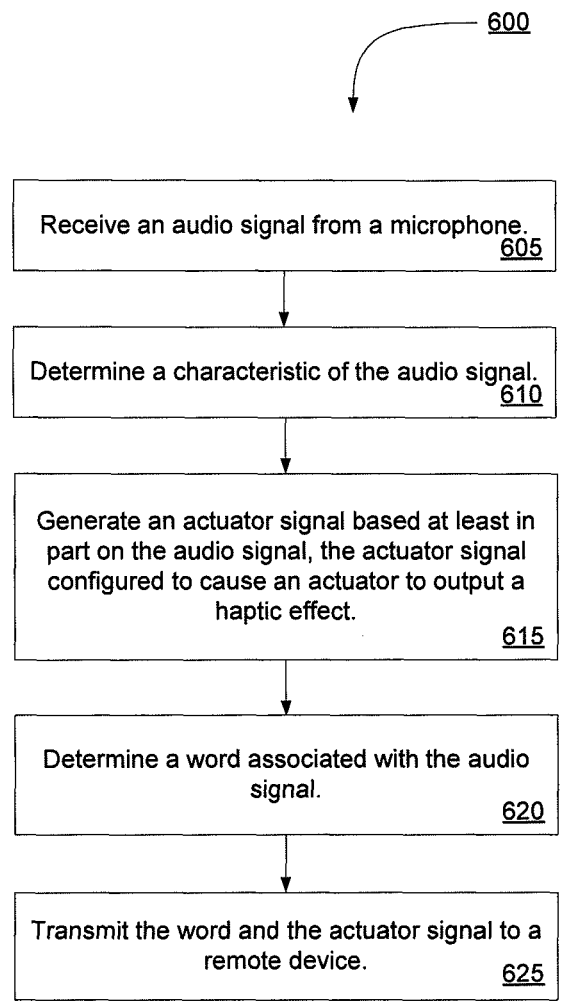
FIG. 6 is a flow diagram of a computer-implemented method for haptic augmentation of voice-to-text conversion according to one embodiment of the present invention.

FIGS. 4-6 are flow diagrams illustrating various methods according to embodiments of the present invention. The flow diagrams are discussed in relation to the mobile device 100 shown in FIG. 1, although various other environments for implementation of embodiments of the present invention may be utilized and several such environments are described herein.

FIG. 4 is a flow diagram of a computer-implemented method for haptic augmentation of voice-to-text conversion according to one embodiment of the present invention. The haptic augmentation method 400 shown in FIG. 4 begins when an input signal is received by a processor 405. In one embodiment, the input signal is received from a microphone 105 in response to the microphone's sensing of a sound wave, such as that produced by a user's voice. In another embodiment, the input signal is received from a biosensor. In other embodiments, the audio signal may be received from a storage media. For instance, in one such embodiment, the audio signal is received at or from a user's voice mail box.

Once the input signal has been received, the processor 110 can analyze the input signal to determine one or more characteristics of the input signal 410. For example, the processor 110 may determine that an audio signal has a particular frequency and/or amplitude. Or the processor 110 may determine that a biosensor signal includes a particular biorhythm.

Based at least in part on the determined characteristic, the processor 110 next generates an actuator signal 415. In one embodiment, the determination is accomplished by searching a library of haptic effects associated with various characteristics. In other embodiments, the determination may be based on a calculation. In some embodiments, a single haptic effect is output. In other embodiments, a plurality of haptic effects may be output.

The processor 110 next transmits the actuator signal to the actuator (115) 415. The actuator signal is configured to cause an actuator 115 to output a particular haptic effect associated with the determined characteristic. Once the actuator 115 receives the signal, the actuator 115 outputs a haptic effect.

Referring now to FIG. 5, FIG. 5 is a flow diagram of a computer-implemented method for haptic augmentation of voice-to-text conversion according to one embodiment of the present invention. The haptic augmentation method 500 shown in FIG. 5 begins when the processor 110 receives an input signal from an input device, such as a microphone or biosensor 505. In the embodiment shown, the input signal is received from a microphone 105.

The processor 110 analyzes the input signal in order to determine a characteristic of the input signal 510. For example, the characteristic may be the frequency, amplitude, duration, or other parameter of an audio signal. Or the characteristic might be a biological measure of a person, such as the person's heart rate, respiration, body temperature, or biorhythm.

The processor 110 then generates one or more actuator signals based at least in part on one or more characteristics of the input signal 515. Each of the actuator signals is configured to cause an actuator to output a haptic effect.

In the embodiment shown, once the actuator signal has been generated, the processor 110 transmits the actuator signal to one or more actuators 520. For example, in one embodiment comprising a single actuator, the processor 110 transmits the actuator signal to only that actuator (e.g., actuator 115). In another embodiment comprising a plurality of actuators, the processor 110 transmits a single actuator signal to all of the actuators. In yet another embodiment, the processor 110 transmits a separate, and potentially distinct, actuator signal to each of the plurality of actuators.

Referring now to FIG. 6, FIG. 6 is a flow diagram of a computer-implemented method for haptic augmentation of voice-to-text conversion according to one embodiment of the present invention. In the haptic augmentation method 600 shown, a processor 110 receives an audio signal 605.

The processor 110 then determines a characteristic of the audio signal 610 and generates an actuator signal based at least in part on the audio signal 615. The actuator signal is configured to cause an actuator 115 to output a haptic effect.

The processor 110 then employs a speech recognition facility to determine a word associated with the audio signal 620. For example, the processor 110 may access a data store that includes a list of words and associated characteristics to match the audio signal to a word.

In the embodiment shown in FIG. 6, once the processor 110 has determined the word associated with the audio signal, the processor determines an actuator signal associated with the word 625. For instance, the actuator signal may be stored in the same data store as is used to determine the word associated with the audio signal. In other embodiments, the data stores are separate and distinct. In yet another embodiment, a haptic escape word is implemented. In such an embodiment, when the user says a particular sequence of words, a haptic effect is associated with that sequence. For instance, the user may say "wink wink" to trigger a particular haptic effect, which may be referred to as a hapticon.

Once the processor 110 determines the word and the actuator signal, the processor 110 transmits them to an actuator (115) 620. The device that receives the word and actuator signal can then output a haptic effect.

Illustrative Implementations of Voice-to-Text Augmentation

Embodiments of the present invention may be implemented in a variety of ways to provide a variety of user experiences. The following examples are described in relation to FIG. 1. For some of these examples, it is assumed that a first user, who is sending a message, and a second user, who is receiving a message, are both using a mobile device 100 as illustrated in FIG. 1. For example, in the embodiment shown in FIG. 1, a sending user may wish to send a text message to a receiving user via the mobile device 100. Instead of using a keyboard to type the text message, the sending user may wish to have a voice message converted into a text message to be sent to the receiving user. Thus, the sending user may speak into the microphone 105, which generates a corresponding audio signal and transmits the audio signal to the processor 110. The processor 110 may also simultaneously or substantially simultaneously convert the speech to text. Such processes of converting speech to text are known to those of skill in the art. One such application is produced by a company called Spin Vox.

The processor 110 receives the sending user's audio signal and determines a characteristic of the audio signal. The characteristic may be the frequency, amplitude, duration, or other parameter of the audio signal. The processor 110 then generates an actuator signal based at least in part on the characteristic of the audio signal created by the sending user. The processor 110 then transmits the actuator signal to the actuator 115, which causes the actuator 115 to output a haptic effect. The haptic effect may be felt by a user.

For instance, if the sending user yells into the microphone 105 of the mobile device 100, the processor 110 may determine that the audio signal has a high amplitude characteristic. The processor 110 may then generate a high amplitude actuator signal configured to cause the actuator 115 to output a high amplitude haptic effect. Thus the haptic effect corresponds to the amplitude characteristic of the original audio signal.

In some embodiments, the processor 110 may be configured to transmit both the actuator signal and the audio signal to the actuator 115 and to a speaker 125, respectively. For instance, referring again to the above example of the a first user yelling into the mobile device 100 and the processor creating a corresponding high amplitude actuator signal, the processor 110 may be configured to transmit the audio signal from the sending user's yell and the resulting high amplitude actuator signal to the speaker 125 and to the actuator 115, respectively. In some embodiments, the speaker 125 may be configured to output both the actuator and audio signals, generating both a haptic effect and a corresponding sound.

In another embodiment, the processor 110 may be configured to determine a word associated with the audio signal and transmit the word and a corresponding actuator signal to a remote device 130. For example, in such an embodiment, if a sending user yells "ANGRY" into the microphone 105, the processor 110 may receive the audio signal from the sending user's yell, determine a high amplitude characteristic of the audio signal, and generate a high amplitude actuator signal configured to cause the actuator 115 to output a high amplitude haptic effect. The processor 110 may also determine that the word "ANGRY" is associated with the audio signal, may store the word "ANGRY" and the high amplitude actuator signal in the computer-readable medium 120, and then transmit the word "ANGRY" and the high amplitude actuator signal to the remote device 130. In another embodiment, the sending user may whisper or say the word "ANGRY" in a normal tone of voice, but the processor 110 may still associate a high amplitude actuator signal with the word based on the nature of the word, i.e., the content, in the communication.

Further, in the embodiment shown in FIG. 1, the processor 110 may be configured to generate a plurality of haptic effects based at least in part on the audio signal. For example, in addition to the processor 110 generating a single high amplitude actuator signal as a result of the sending user yelling "ANGRY" into the microphone 105, the processor 110 may also generate a high frequency haptic effect, a long duration haptic effect, or any combination of haptic effects based at least in part on the audio signal.

In one embodiment, the processor 110 generates an actuator signal by identifying a haptic effect from a haptic effect library associated with the characteristic. For example, if the sending user exclaims "I AM EXCITED" into the microphone 105, the processor 110 may receive the audio signal from the sending user's exclamation, determine a high amplitude, high frequency characteristic of the audio signal, and generate a high amplitude, high frequency actuator signal by identifying the high amplitude, high frequency haptic effect from the haptic effect library associated with the high amplitude, high frequency characteristic.

In another embodiment, the processor 110 may determine a word associated with the audio signal and generate an actuator signal based at least in part on the word. For example, if the processor 110 determines that the word "LOVE" is associated with the audio signal, then the processor 110 may generate a pulsing actuator signal that causes a simulated heartbeat haptic effect by identifying the word "LOVE" in a haptic effect library that associates the word "LOVE" with that particular haptic effect.

In yet another embodiment, the processor 110 may generate an actuator signal based at least in part on the audio signal and at least in part on the word. For example, if the sending user softly and slowly says "LOVE" into the microphone 105, the processor 110 may receive the audio signal from the sending user's statement, may determine a low amplitude, low frequency characteristic of the audio signal, and may generate a low amplitude, low frequency actuator signal. The processor 110 may also determine that the word "LOVE" is associated with the audio signal and may generate a pulsing actuator signal that causes a simulated heartbeat haptic effect by identifying the word "LOVE" in a haptic effect library that associates the word "LOVE" with that particular haptic effect. The processor 110 may be configured to then combine the haptic effects determined by the characteristic of the "LOVE" audio signal and by the characteristic of the word "LOVE," resulting in a low amplitude, low frequency simulated heartbeat haptic effect.

In another embodiment, a sending user may wish to send a receiving user a message via the mobile device 100. The sending user may say into the microphone 105 of the mobile device 100 "HAPPY BIRTHDAY." In response, the processor 110 may determine that the words "HAPPY" and "BIRTHDAY" are associated with the audio signal and may determine a separate haptic effect associated with each word, which the processor 110 transmits to the actuator 115. In one embodiment, the processor generates a pulsing actuator signal that causes a haptic effect corresponding to the "Happy Birthday" song to be transmitted to the actuator of the receiving user's device.

In another embodiment, the processor 110 of the mobile device 100 may generate an actuator signal based at least in part on the audio signal and at least in part on the word contained in the audio signal. For example, if the sending user softly and slowly says "CAT" into the microphone 105 of the mobile device 100, the processor 110 may receive the audio signal from the sending user's statement, determine a low amplitude, low frequency characteristic of the audio signal, and generate a low amplitude, low frequency actuator signal. Alternatively, the processor 110 may determine that the word "CAT" is associated with the audio signal and generate a fast-pulsing actuator signal that causes a purring haptic effect.

Referring to FIG. 3, in yet another embodiment, a sending user may scream "HELP" into the input device 335, e.g., microphone, of the first device 300, which comprises a mobile telephone. The processor 310 of the first device 300 may receive the audio signal from the microphone 335, determine a high amplitude, long duration characteristic of the audio signal, and generate a high amplitude, short duration actuator signal. Similarly, the processor 310 of the first device 300 may be configured to determine the word "HELP" associated with the audio signal and store the word "HELP" and the actuator signal in the computer-readable medium 315. Further, the processor 310 of the first device 300 may be configured to generate the high amplitude, short duration actuator signal by identifying a high amplitude, short duration haptic effect from a haptic effect library associated with the high amplitude, short duration characteristic. Similarly, the processor 310 of the first device 300 may be configured to generate a high amplitude, short duration actuator signal that causes a pulsing Morse code S.O.S. haptic effect (dot-dot-dot long-long-long dot-dot-dot) by identifying the word "HELP" in a haptic effect library that associates the word "HELP" with that particular haptic effect.

Referring to FIG. 3, in yet another embodiment, the first device 300 is a sending user's device and is configured such that it is in an automated "listening" response mode in which it automatically transmits haptic, aural and/or visual messages to a second receiving device 350 based on predefined environmental sounds. For example, if a police officer is the sending user with his mobile device in automated "listening" response mode, his device may be configured to automatically transmit a request for support or officer backup if the sound of gunfire is identified by the officer's device. In another example of this listening mode, the officer's device may be listening to the officer's biorhythms and may detect the officer needs medical attention and automatically transmits a request for an ambulance. The transmission of these requests might be task specific and localized. For example, the transmission might be directed to one or more recipients nearby, such as the officer's team members. For example, if a group of officers were doing a coordinated search for a fugitive and one of the officers locates the fugitive, the officer's "listening" device may transmit an automated message to surrounding officers that would help the officer's close in on the location of the fugitive. Such a feature is very helpful if the officer was physically unable to communicate this information to fellow officers, for instance, if the officer was in a struggle or footrace with the fugitive.

In such embodiments, the resultant audio signal, words, actuator signal, and/or haptic effects may be transmitted from the first device 300 to the second device 350 via their respective network interfaces 320 and 370 and via a network 380. For example, the word "HELP" and the high amplitude, short duration Morse code S.O.S. haptic effect associated with the word "HELP" may be transmitted from the first device 300, which comprises a mobile telephone, to the second device 350, which also comprises a mobile telephone, via a network 380, which comprises a telecommunication network. Thus, the sending user of the first device 300 can transmit a voice-to-text message with a haptic effect to the receiving user of the second device 350. In other embodiments, only the audio signal may be transmitted from the first device 300 to the second device 350, which then analyzes the signal and generates any associated haptic effects.

Illustrative Environments for Implementation

Embodiments of the present invention may be advantageously employed in the context of telecommunications for the disabled. For example, embodiments may be useful in TTY (telephone typewriter) applications, which aid people who have hearing or speech difficulties by means of an electronic device for text communication via a telephone line. When a disabled person uses a traditional TTY device, the emotion and feeling of a message is typically lost due to the nature of text. Using an embodiment of the present invention, a disabled person may speak into a microphone and preserve the emotion behind a voice-to-text message via haptic effects instead of directly typing a text message on a traditional TTY device, where any emotional feeling associated with the message is lost.

Embodiments of the present invention may also be advantageously employed in the SMS text messaging context. For example, many states outlaw text messaging and talking on a mobile telephone while driving an automobile, but those same states typically allow a driver to use a hands-free device, such as a wireless Bluetooth earpiece or a wired microphone and earpiece, to talk while driving. These hands-free devices, however, do not aid in sending a text message while driving an automobile. Using an embodiment of the present invention, a driver may speak into a microphone and have his voice message converted into a text message with associated haptic effects. Not only does an embodiment of the present invention allow a driver to legally and safely send a text message while driving, but it preserves the emotion from a voice message via haptic effects, allowing the sending user to communicate his emotion to a receiving user.

Embodiments of the present invention may also be advantageously employed in the online chat context or the e-mail context. A sending user can speak into a microphone and have her voice message converted into a text message for a chat or an e-mail to be sent via the Internet to a receiving user. A haptic effect associated with the voice message or with the words of the resulting chat message or e-mail may be sent with the chat message or e-mail, allowing a wide variety of emotions, such as sarcasm, sincerity, or anger, and other content and subtext to be conveyed. This embodiment allows a sending user more freedom to express a desired message across a computer network.

Embodiments of the present invention may also be advantageously employed in the medical context. For example, a patient who is a quadriplegic or is otherwise hindered may be able to interact with a computer or a telephone through the use of voice messages and by receiving haptic responses. A bed may be outfitted with one or more actuators that are connected wirelessly to a computer. Based upon voice messages converted to text messages from a sending or receiving user, various haptic effects may be inputted and outputted. Similar advantages may be realized if the user is sight and/or hearing impaired, thereby reducing or restricting the number of available communication channels. Embodiments of the present invention may also be advantageously employed in noisy or bright environments that might otherwise interfere with audible or visual responses. For example, in one embodiment of the present invention, an elderly person who has fallen may send or receive haptic feedback from an embodiment of the present invention to indicate to emergency services that assistance is need or that assistance is on its way.

Some embodiments of the present invention may also be useful in a military context. For example, in a covert operation, audio channels may be restricted to specific types of communication or not available. In one embodiment of the present invention, users may be able to get a text message with haptic confirmation from a military operative that is not able to send a voice message. For example, a soldier may be able to vocalize a response to a command that is converted into text and transmitted to another soldier as text and a haptic effect. In such an embodiment, the soldiers may employ an established set of haptic patterns to allow effective communication between one or more soldiers. For example, a commander may be in an area where verbal communication is deemed safe and may be monitoring a group of soldiers' progress through a hostile environment. The commander may issue a verbal command to indicate the soldiers should turn left. The voice command may be recognized and transmitted to the soldiers as a text message and a haptic effect.

General

While this invention has been described in terms of several preferred embodiments, it is contemplated that alterations, permutations, and equivalents thereof will become apparent to those skilled in the art upon a reading of the specification and study of the drawings. For example, many different application programs can use the voice-to-text messaging functions of the present invention, including game programs, virtual reality programs and environments, teleconferencing applications for business meetings, telephone-type voice communications over computer networks or other communication channels, etc. Furthermore, certain terminology has been used for the purposes of descriptive clarity, and not to limit the present invention. It is therefore intended that the following appended claims include all such alterations, permutations, and equivalents as fall within the true spirit and scope of the present invention.

Thus, the foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

The invention claimed is:

1. A computer-implemented method comprising:
receiving a plurality of input signals, by a processor, the input signals associated with a plurality of input types, the input types including a voice, an environmental sound, or a biorhythm;
determining, by a processor, characteristics of the input signals;
converting, by a processor, an input signal to text;
determining, by a processor, a haptic effect based at least in part on the characteristics; and
transmitting a message to a remote device, wherein the message comprises:
the text, and
data associated with the haptic effect, the data configured to cause the remote device to output the haptic effect.

2. The computer-implemented method of claim 1, wherein at least one of the characteristics comprises one of a frequency, an amplitude, or a duration.

3. The computer-implemented method of claim 2, wherein at least one of the characteristics comprises a high amplitude and wherein the actuator signal comprises a correspondingly high amplitude actuator signal.

4. The computer-implemented method of claim 1, wherein receiving the plurality of input signals comprises receiving an audio signal from a microphone.

5. The computer-implemented method of claim 4, further comprising transmitting, by a processor, the audio signal to the remote device, wherein the remote device is configured to output the audio signal.

6. The computer-implemented method of claim 4, further comprising:
determining a word associated with the audio signal; and
determining the haptic effect based in part on the word.

7. The computer-implemented method of claim 1, further comprising transmitting, by a processor, an actuator signal associated with the haptic effect to an actuator.

8. The computer-implemented method of claim 1, further comprising generating, by a processor, a plurality of haptic effects based at least in part on the characteristics.

9. The computer-implemented method of claim 1, wherein receiving the input signal comprises receiving a biorhythm signal from a biosensor, and wherein the haptic effect is further based a characteristic of the biological information.

10. A non-transitory computer-readable medium encoded with processor executable program code, the computer-readable medium comprising:
program code for receiving a plurality of input signals, by a processor, the input signals associated with a plurality of input types, the input types including a voice, an environmental sound, or a biorhythm;
program code for determining characteristics of the input signals;
program code for converting an input signal to text;
program code for determining a haptic effect based at least in part on the characteristics; and
program code for transmitting a message to a remote device, wherein the message comprises:
the text, and
data associated with the haptic effect, the data configured to cause the remote device to output the haptic effect.

11. The non-transitory computer-readable medium of claim 10, wherein at least one of the characteristics comprises a frequency, an amplitude, or a duration.

12. The non-transitory computer-readable medium of claim 10, further comprising program code for transmitting an actuator signal associated with the haptic effect to an actuator.

13. The non-transitory computer-readable medium of claim 12, further comprising program code for transmitting the input signals and the actuator signal to a device configured to output the input signals and the actuator signal.

14. The non-transitory computer-readable medium of claim 10, further comprising:
program code for determining a word associated with the input signals; and
program code for determining the haptic effect based in part on the word.

15. The non-transitory computer-readable medium of claim 10, further comprising program code for generating a plurality of haptic effects based at least in part on the characteristics.

16. A system comprising:
a memory; and
a processor in communication with the memory and configured to:
receive a plurality of input signals, by a processor, the input signals associated with a plurality of input types, the input types including a voice, an environmental sound, or a biorhythm;
determine characteristics of the input signals;
convert an input signal to text; and
determine a haptic effect based at least in part on the characteristics of the input signals; and
transmit a message to a remote device, wherein the message comprises:
the text; and data associated with the haptic effect, the data configured to cause the remote device to output the haptic effect.

17. The system of claim 16, wherein the processor is further configured to:
   determine a word associated with the input signals; and
   determine the haptic effect based in part on the word.

18. The system of claim 16, wherein the processor is further configured to generate a plurality of actuator signals based at least in part on the characteristic.

19. The system of claim 16, further comprising a microphone in communication with the processor, the microphone configured to:
   receive a spoken text input;
   generate an audio signal corresponding to the spoken text input; and
   transmit the audio signal to the processor as the input signal.

20. The system of claim 16, further comprising an actuator in communication with the processor, the actuator configured to receive an actuator signal associated with the haptic effect and output the haptic effect.

21. The system of claim 16, further comprising a biosensor configured to determine a biorhythm signal and generate the input signal based at least in part on the biorhythm signal, and wherein the haptic effect is further based a characteristic of the biorhythm signal.

22. The system of claim 16, further comprising a housing for containing the memory, the processor, and the actuator.

\* \* \* \* \*